US 11,625,279 B2

(12) United States Patent
Lustig et al.

(10) Patent No.: US 11,625,279 B2
(45) Date of Patent: Apr. 11, 2023

(54) READ-WRITE PAGE REPLICATION FOR MULTIPLE COMPUTE UNITS

(71) Applicant: NVIDIA Corporation, Santa Clara, CA (US)

(72) Inventors: Daniel Lustig, Somerville, MA (US); Oreste Villa, West Richland, WA (US); David Nellans, Round Rock, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 385 days.

(21) Appl. No.: 16/787,967

(22) Filed: Feb. 11, 2020

(65) Prior Publication Data
US 2021/0248014 A1 Aug. 12, 2021

(51) Int. Cl.
G06F 9/50 (2006.01)
G06F 11/30 (2006.01)
G06F 9/54 (2006.01)
G06F 12/1027 (2016.01)
G06F 11/07 (2006.01)
G06F 12/0882 (2016.01)

(52) U.S. Cl.
CPC .......... G06F 9/5072 (2013.01); G06F 9/5016 (2013.01); G06F 9/544 (2013.01); G06F 11/0772 (2013.01); G06F 11/3006 (2013.01); G06F 11/3037 (2013.01); G06F 12/0882 (2013.01); G06F 12/1027 (2013.01)

(58) Field of Classification Search
CPC ...... G06F 9/5072; G06F 9/5016; G06F 9/544; G06F 11/0772; G06F 11/3006; G06F 11/3037; G06F 12/0882; G06F 12/1027; G06F 11/073; G06F 11/2094; G06F 12/084; G06F 12/0811
See application file for complete search history.

(56) References Cited

U.S. PATENT DOCUMENTS

2018/0336133 A1* 11/2018 Turner ............... G06F 12/1072
2019/0179538 A1* 6/2019 van Riel ............ G06F 9/45558
2019/0188148 A1* 6/2019 Dong ................. G06F 12/1081

* cited by examiner

Primary Examiner — Sisley N Kim
(74) Attorney, Agent, or Firm — Zilka-Kotab, P.C.

(57) ABSTRACT

In general, an application executes on a compute unit, such as a central processing unit (CPU) or graphics processing unit (GPU), to perform some function(s). In some circumstances, improved performance of an application, such as a graphics application, may be provided by executing the application across multiple compute units. However, when using multiple compute units in this manner, synchronization must be provided between the compute units. Synchronization, including the sharing of the data, is typically accomplished through memory. While a shared memory may cause bottlenecks, employing local memory for each compute unit may itself require synchronization (coherence) which can be costly in terms of resources, delay, etc. The present disclosure provides read-write page replication for multiple compute units that avoids the traditional challenges associated with coherence.

26 Claims, 10 Drawing Sheets

READ-WRITE PAGE REPLICATION FOR MULTIPLE COMPUTE UNITS

This invention was made with US Government support under Agreement H98230-16-3-0001 awarded by DoD. The US Government has certain rights in this invention.

TECHNICAL FIELD

The present disclosure relates to memory used in multiple compute unit environments.

BACKGROUND

In general, an application executes on a compute unit, such as a central processing unit (CPU) or graphics processing unit (GPU), to perform some function(s). In some circumstances, improved performance of an application, such as a graphics application, may be provided by executing the application across multiple compute units, which may be CPUs, GPUs or a combination thereof. However, when using multiple compute units in this manner, synchronization must be provided between the compute units. Synchronization, including the sharing of the data, is typically accomplished through memory.

A shared memory may cause bottlenecks between the compute units as a result of comparatively high latency and low bandwidth of the interconnects between the compute units and the memory. To address this issue, each compute unit may have a corresponding memory unit to which it reads data and writes data. The locality of memory for each compute unit can increase the speed at which the compute units can perform read/write operations. On the other hand, there are still challenges in synchronizing the multiple compute units when multiple different memory units are employed. For example, synchronizing the memory units themselves (i.e. providing coherence to avoid different data in different memory units) may be costly in terms of resources, delay, etc.

There is a need for addressing these issues and/or other issues associated with the prior art.

SUMMARY

A method, computer readable medium, and system are disclosed for read-write page replication for multiple compute units. In use, a plurality of duplicate memory pages are created for a plurality of compute units, where local memory of each compute unit of the plurality of compute units stores a respective duplicate memory page of the plurality of duplicate memory pages. Additionally, a memory instruction issued by a particular compute unit of the plurality of compute units to the respective duplicate memory page stored in the local memory of the particular compute unit is intercepted. Further, the memory instruction is identified as being annotated to indicate that coherence across the plurality of compute units is required. Still yet, responsive to identifying that the memory instruction is annotated to indicate that coherence across the plurality of compute units is required, the plurality of duplicate memory pages are collapsed to create a shared memory page in local memory of a select compute unit of the plurality of compute units. The memory instruction is then caused to be performed on the shared memory page.

DETAILED DESCRIPTION

Figure 1:
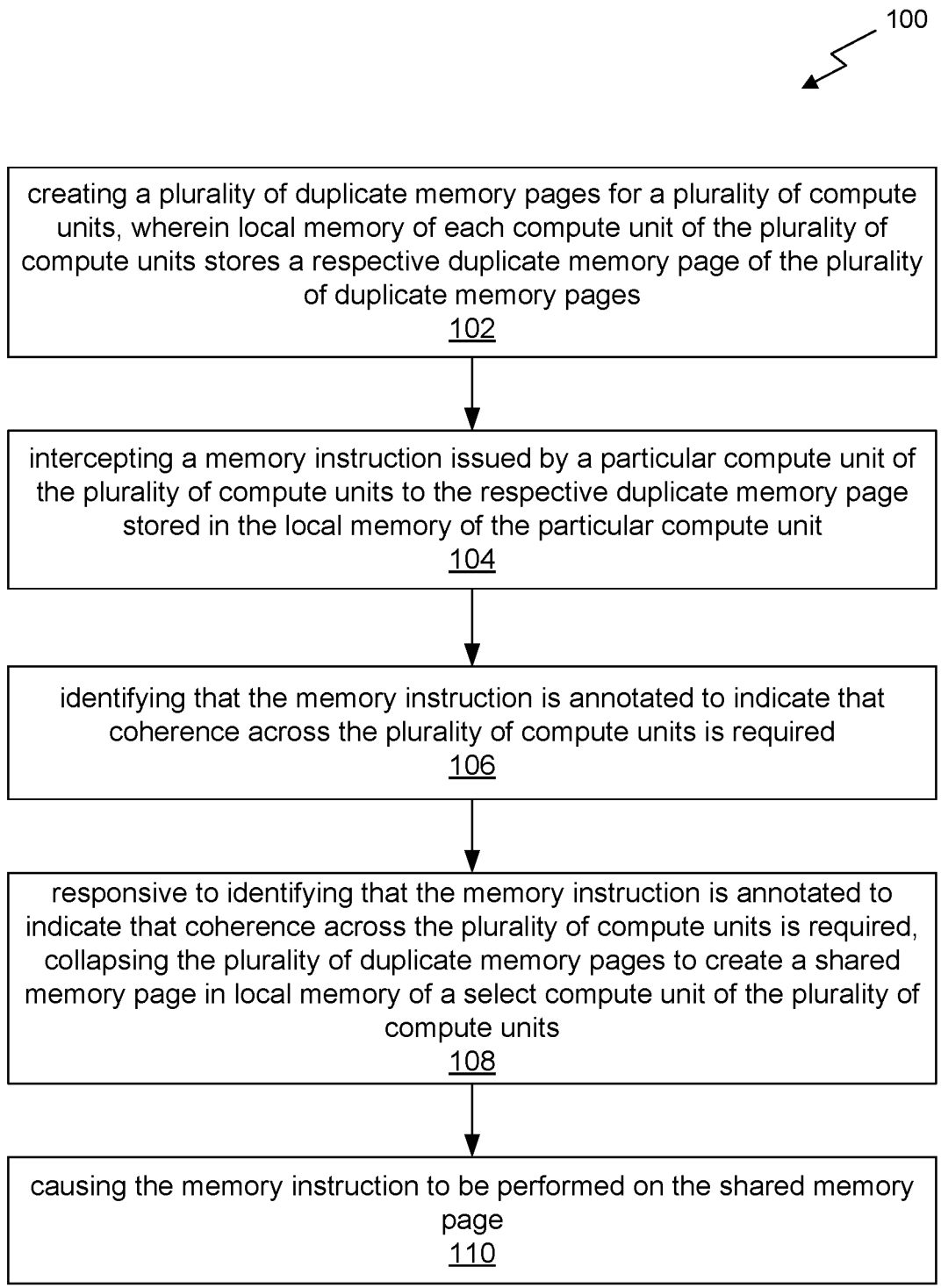
FIG. 1 illustrates a flowchart of a method for read-write page replication for multiple compute units, in accordance with an embodiment.

FIG. 1 illustrates a flowchart of a method 100 for read-write page replication for multiple compute units, in accordance with an embodiment. The method 100 may be performed by any computing system, for example that includes a processing unit, program, custom circuitry, etc. As described below, the present method 100 is performed with respect to multiple compute units of a system, and therefore the method 100 may performed by one or more of those compute units and/or by another processor, program, custom circuitry, etc. of the system.

As shown in operation 102, a plurality of duplicate memory pages are created for a plurality of compute units, where local memory of each compute unit of the plurality of compute units stores a respective duplicate memory page of the plurality of duplicate memory pages. In the context of the present description, the compute units may be central processing units (CPUs), graphics processing units (GPUs), and/or any other type of processing unit. The compute units may be integrated within a single system (e.g. computer system). In this way, the system may provide parallel processing capabilities for use by one or more applications.

As noted above, a duplicate memory page is created for each of the compute units and stored in the local memory of the compute unit. Where the compute unit is a CPU, the local memory may be system memory (i.e. memory of the system that includes the CPU). On the other hand, where the compute unit is a GPU, the local memory may be device memory of the GPU. In any case, the local memory for each compute unit is local (e.g. close in proximity) to that compute unit to reduce latency otherwise caused by use of remote memory.

A page (e.g. a portion of memory) is duplicated across the local memories of the compute units such that a duplicate memory page is created for each of the compute units and stored in the local memory of the compute unit. The page may be duplicated with respect to a situation where the multiple compute units request access to the page. For example, a separate physical copy of the page is created in the local memory of each compute unit. Further, a bit may be set in association with the page to indicate that the page has been duplicated, as described in more detail below with reference to FIG. 2.

Additionally, as shown in operation 104, a memory instruction issued by a particular compute unit of the plurality of compute units to the respective duplicate memory page stored in the local memory of the particular compute unit is intercepted. In other words, a memory instructions issued by one of the compute units to its locally stored duplicate memory page is intercepted. The memory instruction may be a store instruction, atomic instruction, or a reduction instruction, in various embodiments.

Further, as shown in operation 106, the memory instruction is identified as being annotated to indicate that coherence across the plurality of compute units is required. In particular, the memory instruction may be annotated in accordance with a defined consistency model for the system. Per the consistency model, memory instructions issued by the compute units may be annotated to indicate whether coherence (i.e. synchronization across the local memories) is required. In an embodiment, the memory instructions may be annotated in advance by a programmer of an application causing the memory instructions to be issued.

In the present method, the memory instruction intercepted in operation 104 is annotated to indicate that coherence is required. Embodiments for handling memory instructions annotated to indicate that coherence is not required will be described in detail below with reference to FIG. 2B. It should be noted that where coherence is required, staleness of the data in the local memories may not be allowed with respect to the memory instruction. For example, the memory instruction may first require performance of earlier memory instructions issued by the compute units in order to provide a proper result. However, where coherence is not required, staleness of the data in the local memories may be allowed (e.g. for some period of time), such as where the memory instruction will not be negatively affected by stale data resulting from the earlier memory instructions not having yet been performed.

Still yet, as shown in operation 108, responsive to identifying that the memory instruction is annotated to indicate that coherence across the plurality of compute units is required, the plurality of duplicate memory pages are collapsed to create a shared memory page in local memory of a select compute unit of the plurality of compute units. The duplicate memory pages may be collapsed in a manner that results in a single instance of the page (i.e. the shared memory page) that incorporates all prior memory instructions issued by the compute units. Thus, the shared memory page may store a most recent version of the data.

It should be noted that the local memory of any one of the compute units may be utilized for storing the shared memory page, so long as each of the compute units is then properly configured to access the correct local memory storing the shared memory page. For example, the select compute unit may, or may not be, the same compute unit as the particular compute unit that issued the memory instruction. The select compute unit may be predefined (e.g. by a user) or selected in any other manner. More details regarding the method for collapsing the duplicate memory pages into the shared memory page for use by the compute units will provided below with reference to FIG. 2C.

As shown in operation 110, the memory instruction is then caused to be performed on the shared memory page. Furthermore, after creating the shared memory page, the compute units are configured to issue subsequent memory instructions to the shared memory page. In this way, the collapsing of duplicate memory pages to create the shared memory page and the causing the memory instruction to be performed on the shared memory page may ensure coherence for the memory instruction.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2A:
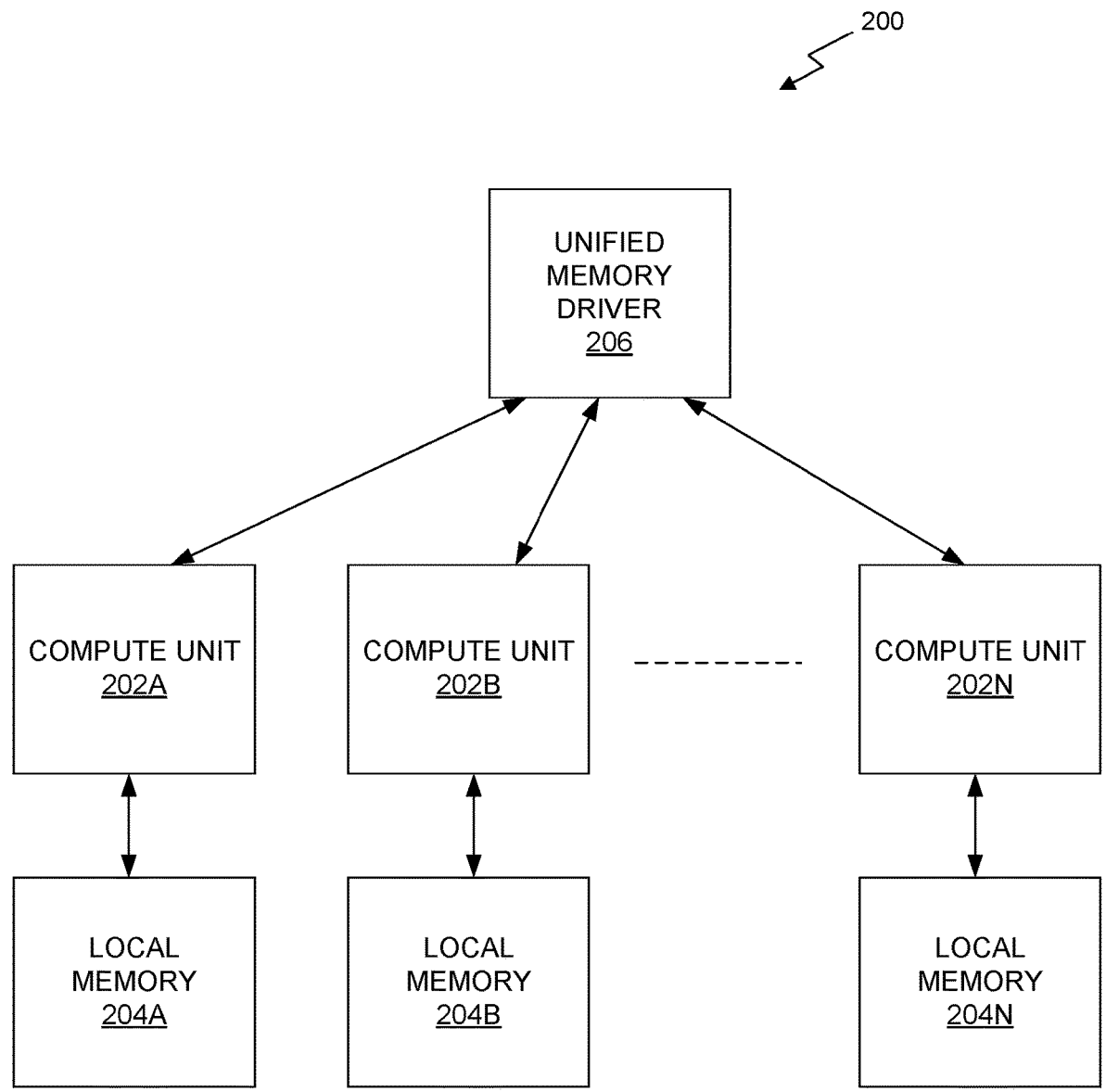
FIG. 2A illustrates a block diagram of a system providing read-write page replication for multiple compute units, in accordance with an embodiment.

FIG. 2A illustrates a block diagram of a system 200 providing read-write page replication for multiple compute units, in accordance with an embodiment. The system 200 may be implemented in the context of the details of FIG. 1. Thus, the definitions and embodiments provided above may equally apply to the present description.

As shown, the system 200 includes a plurality of compute units 202A-N each having a corresponding local memory 204A-N. The system further includes a unified (or other) memory driver 206 for use in ensuring coherence as required by certain memory instructions. While the system is shown to include the unified memory driver 206, it should be noted that any other driver, code, logic, or even operating system may perform the operations described below with reference to the unified memory driver 206.

In an embodiment, a page is duplicated across the local memories 204A-N by storing a separate physical copy of the page in each local memory 204A-N of the compute units 202A-N that request access to the page (or as selected by some other heuristic). Thus, in an embodiment, the page may only be duplicated across the local memories 204A-N of a proper subset of all compute units 202A-N of the computing system 200 (e.g. duplicated for those compute units 202A-N requesting access to the page). A first write-duplicate bit is set in a page table entry for the page which indicates that the page has been duplicated to create the plurality of duplicate memory pages in the local memories 204A-N. Further, a second write-duplicate bit is set (i.e. cached locally) in a translation lookaside buffer (TLB) of each compute unit 202A-N which indicates that the page has been duplicated (i.e. that the locally stored duplicate memory page is in fact one of multiple existing duplicates of the page). Thus, each page table entry and TLB entry may be augmented, in the present system 200, to include a new bit indicating whether a page has been duplicated.

When the write-duplicated bit is set for a page in the page table entry and TLB entry, all loads to that page by each compute unit 202A-N are performed via that compute unit's 202A-N cache hierarchy and via the locally stored duplicate memory page, providing full local bandwidth. All store, atomic, and reduction memory instructions which are not annotated to require coherence are multicast to all of the duplicate memory pages in the local memories 204A-N, including the duplicate memory page in the local memory 204A-N of the compute unit 202A-N that issued the memory instruction. The multicasting is performed via hardware multicast support added to the compute unit and to the network switch. In general, the multicasting may cause performance of the memory instruction to be delayed, to some extent, for the local memories 204A-N of the other compute units 202A-N, or for memory instructions issued by multiple compute units 202A-N to cross one another, thus in either case resulting in stale data in those local memories 204A-N.

A store, atomic, or reduction memory instruction which is annotated to require coherence will result in the duplicate memory pages stored in the local memories 204A-N being collapsed into a shared memory page. In an embodiment, this type of annotated memory instruction (i.e. requiring coherence) may trigger a page fault at the TLB of the compute unit 202A-N that issued the memory instruction, particularly where the write-duplicated bit has been set for the page in the TLB of the compute unit. This in turn may result in the duplicate memory pages being collapsed to a single shared memory page stored in local memory 204A-N of a single one of the compute units 202A-N.

As an option, CPU memory instructions may not necessarily trigger the fault mentioned above, in which case the fault may be triggered for memory instructions issued by GPUs. A memory fence may instead flush multicast stores in flight to other compute units 202A-N, but it need not trigger the collapsing of the duplicate memory pages. As yet another option, one compute unit 202A-N (e.g. one CPU or one GPU) may be selected to be the compute unit 202A-N that is allowed to perform accesses requiring coherence without collapsing the duplicate memory pages. In this case, the page fault described above would not be generated for memory instructions of the select compute unit 202A-N even when those memory instructions require coherence.

Figure 2B:
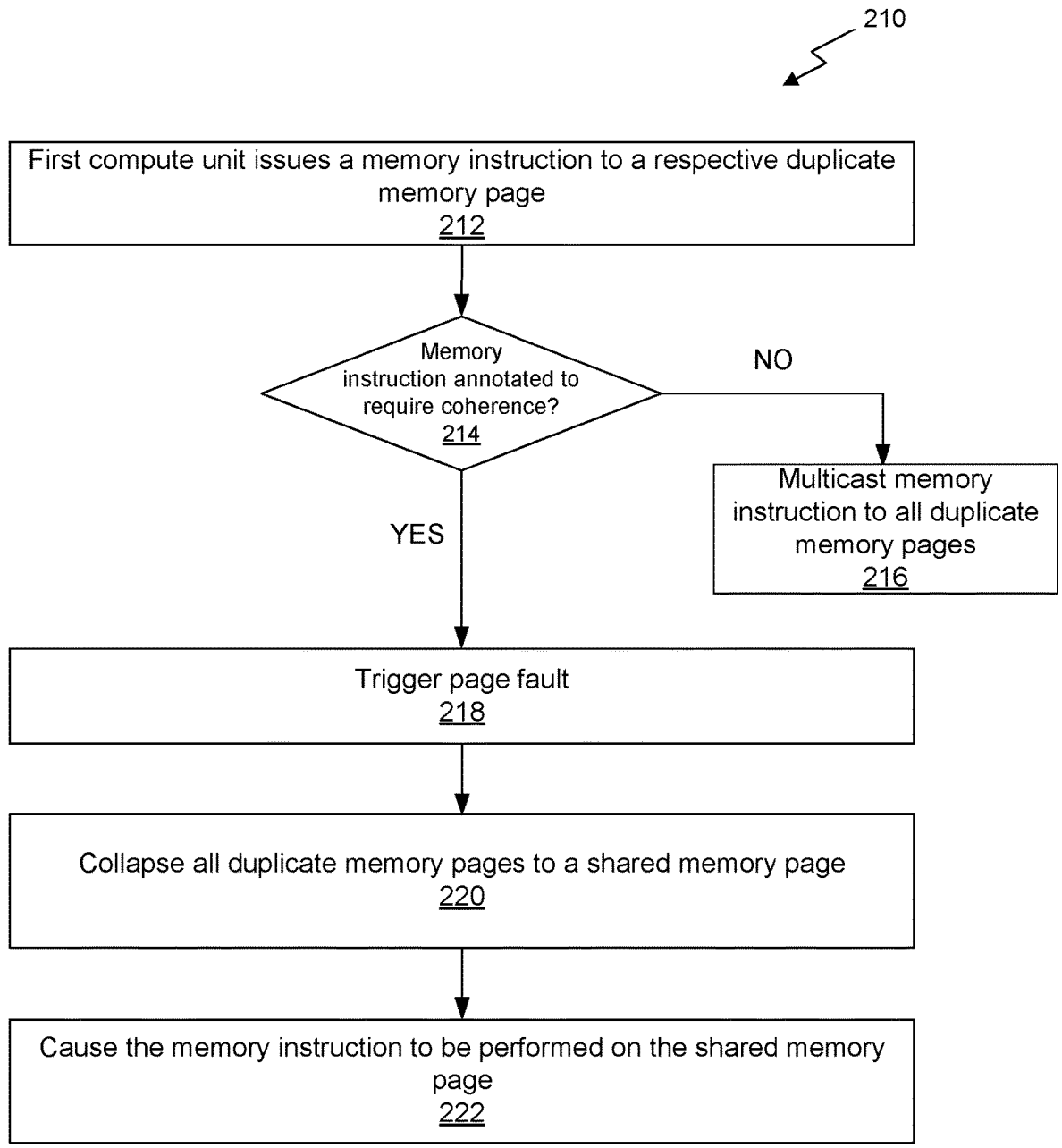
FIG. 2B illustrates a flowchart of a method of the system of FIG. 2A, in accordance with an embodiment.

FIG. 2B illustrates a flowchart of a method 210 of the system 200 of FIG. 2A, in accordance with an embodiment. It should be noted that the method 210 is just one exemplary process for the system 200 of FIG. 2A.

As shown in operation 212, a first compute unit, referenced hereinafter as 202A, issues a memory instruction to a respective duplicate memory page stored in local memory 204A of the first compute unit 202A. The first compute unit 202A may determine that the memory instruction is directed towards a page that has been duplicated based on a write-duplicate bit set for the page in the TLB of the first compute unit 202A.

In decision 214 it is determined whether the memory instruction is annotated to require coherence. In response to determining in decision 214 that the memory instruction is annotated to not require coherence, the memory instruction is multicast to all duplicate memory pages stored in the local memories 204A-N of the compute units 202A-N, as shown in operation 216.

In response to determining in decision 214 that the memory instruction is annotated to require coherence, a page fault is triggered, as shown in operation 218. Responsive to the page fault, all duplicate memory pages are collapsed to a shared memory page, as shown in operation 220. Further, the memory instruction is performed on the shared memory page, as shown in operation 222.

Figure 2C:
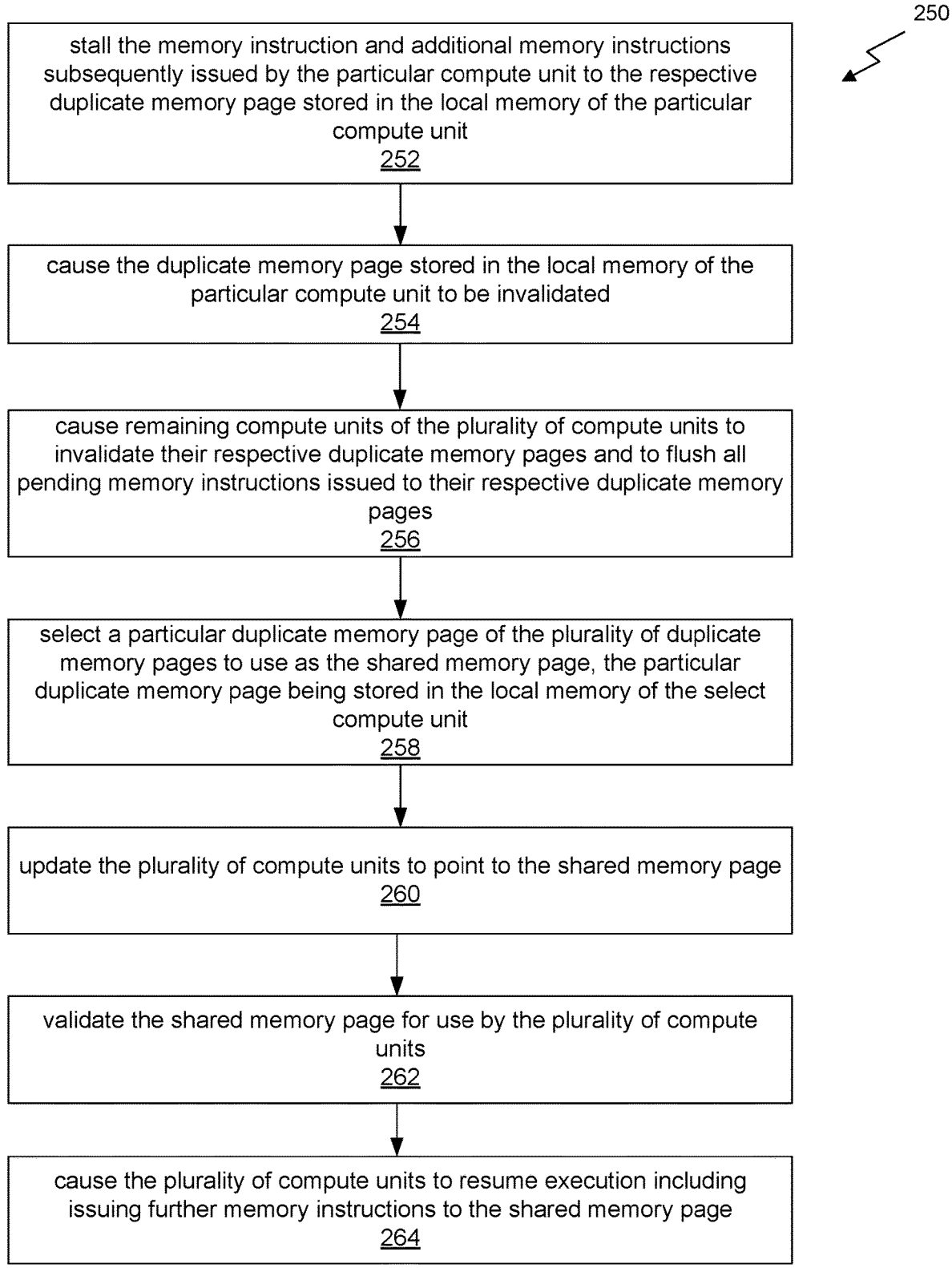
FIG. 2C illustrates a flowchart of a method for collapsing the plurality of duplicate memory pages of FIG. 2A to create a shared memory page for use by the plurality of compute units, in accordance with an embodiment.

FIG. 2C illustrates a flowchart of a method 250 for collapsing the plurality of duplicate memory pages of FIG. 2A to create a shared memory page for use by the plurality of compute units 202A-N, in accordance with an embodiment. It should be noted that the method 250 is just one exemplary process by which the plurality of duplicate memory pages may be collapsed to form the shared memory page.

In operation 252, once the page fault is triggered in the compute unit 202A that issued the memory instruction (in operation 212), the TLB of that compute unit 202A stalls the memory instruction and any additional memory instructions subsequently issued by that compute unit 202A to the respective duplicate memory page stored in the local memory 204A. In this way, the compute unit 202A may be prevented from accessing its locally stored duplicate memory page.

In operation 254, the duplicate memory page stored in the local memory 204A of the compute unit 202A is invalidated. This may be accomplished using a valid bit corresponding to the locally stored duplicate memory page. In operation 256, the duplicate memory pages stored locally by the remaining compute units 202B-N are invalidated and all pending memory instructions issued by those remaining compute units 202B-N to their respective duplicate memory pages are flushed.

In one embodiment, when the page fault is triggered, a fault message may be sent from the compute unit 202A to a unified memory driver 206. The unified memory driver 206, responsive to receiving the fault message, may then mark, or cause to be marked, the duplicate memory page stored in the local memory 204A of the compute unit 202A as invalid. The unified memory driver 206 may further process the fault message by verifying that the fault message was received as a result of the memory instruction being annotated to indicate that coherence is required, and further verifying that the memory instruction is directed towards a page that has been duplicated (as indicated by the write-duplicate bit for the page).

If the fault message is not verified as described above, the fault may be processed via the standard faulting mechanisms. However, when the fault message is verified, the unified memory driver 206 may send TLB shootdown messages to the remaining compute units 202B-N to cause the remaining compute units 202B-N to perform operation 256 mentioned above. The unified memory driver 206 may then wait for operation 256 to be acknowledged and completed.

Additionally, in operation 258, a particular one of the duplicate memory pages is selected to use as the shared memory page. In an embodiment, the unified memory driver 206 may select one of the duplicate memory pages to be the shared memory page (e.g. based on heuristics). The unselected duplicate memory pages may be freed in their local memory.

Further, in operation 260, the plurality of compute units 202A-N are updated to point to the shared memory page. Still yet, the shared memory page is validated for use by the compute units 202A-N (e.g. by setting the valid bit). For example, all page table entries for the page may be updated to point to the shared memory page, to un-set the write-duplicated bit, and to validate the shared memory page.

Moreover, the compute units 202A-N are caused to resume execution including issuing further memory instructions to the shared memory page. In an embodiment, the unified memory driver 206 may send a resume signal to all of the TLB s that had stalled waiting for the fault to be handled, and in response to the signal the compute units 202A-N may resume execution using the new page table entry pointing to the shared memory page. This method 250 may ensure coherence for the memory instruction annotated as requiring coherence.

In one embodiment, these mechanisms may be exposed to a user as a small extension to an existing unified memory application programming interface (API). Specifically, an API may be added as an instruction to the unified memory driver 206 to perform the methods described above. The unified memory driver 206 may follow the user's requests exactly, or it may choose to perform some conservative approximation, according to some heuristic and/or resource constraints.

The methods described above aggressively optimize for the relaxed memory behaviors permitted under recent GPU memory consistency models by refraining from enforcing coherence at all, to the extent permitted by the memory model. The methods also take advantage of network multicast support. The embodiments described above largely eliminate issues with false sharing of memory pages across compute units. Namely, each compute unit can access its own local physical copy of the memory page, and the stores (store memory instructions) will be multicast to other compute units in the background, entirely off of the critical path (until if/when a membar/memory fence is performed). Embodiments can also lower network latency of any true communication, as writes are "pushed" to the consumer, rather than being "pulled" from the producer.

As such, it will facilitate strong scaling of GPU workloads across multiple GPUs. Early simulation experiments have shown quantitative benefits to this effect.

It should be noted that in a further embodiment the page may be re-replicated after having been collapsed. The re-replication could be triggered by user request or by some heuristic or approximation thereof. In general, the re-replication would be similar to that of collapse, but would be creating new pages rather than invalidating existing ones. For example, the page may be re-replicated according to the page replication process described above with respect to FIG. 2A, in an embodiment. Once re-replicated, the page may also again be collapsed according to the methods described above. In this way, the page may be replicated and collapsed repeatedly, to support operation of the compute units 202A-N.

Parallel Processing Architecture

Figure 3:
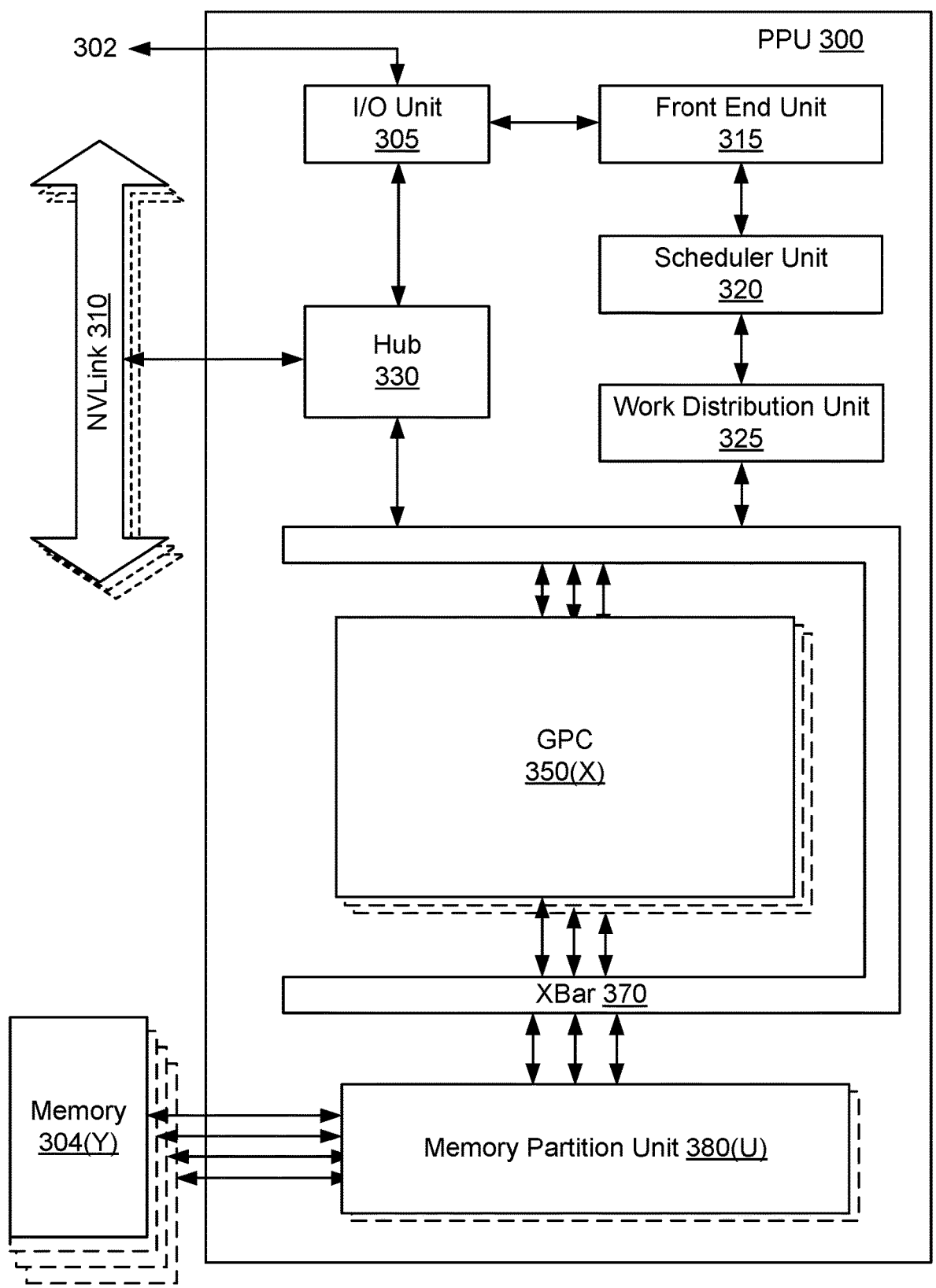
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
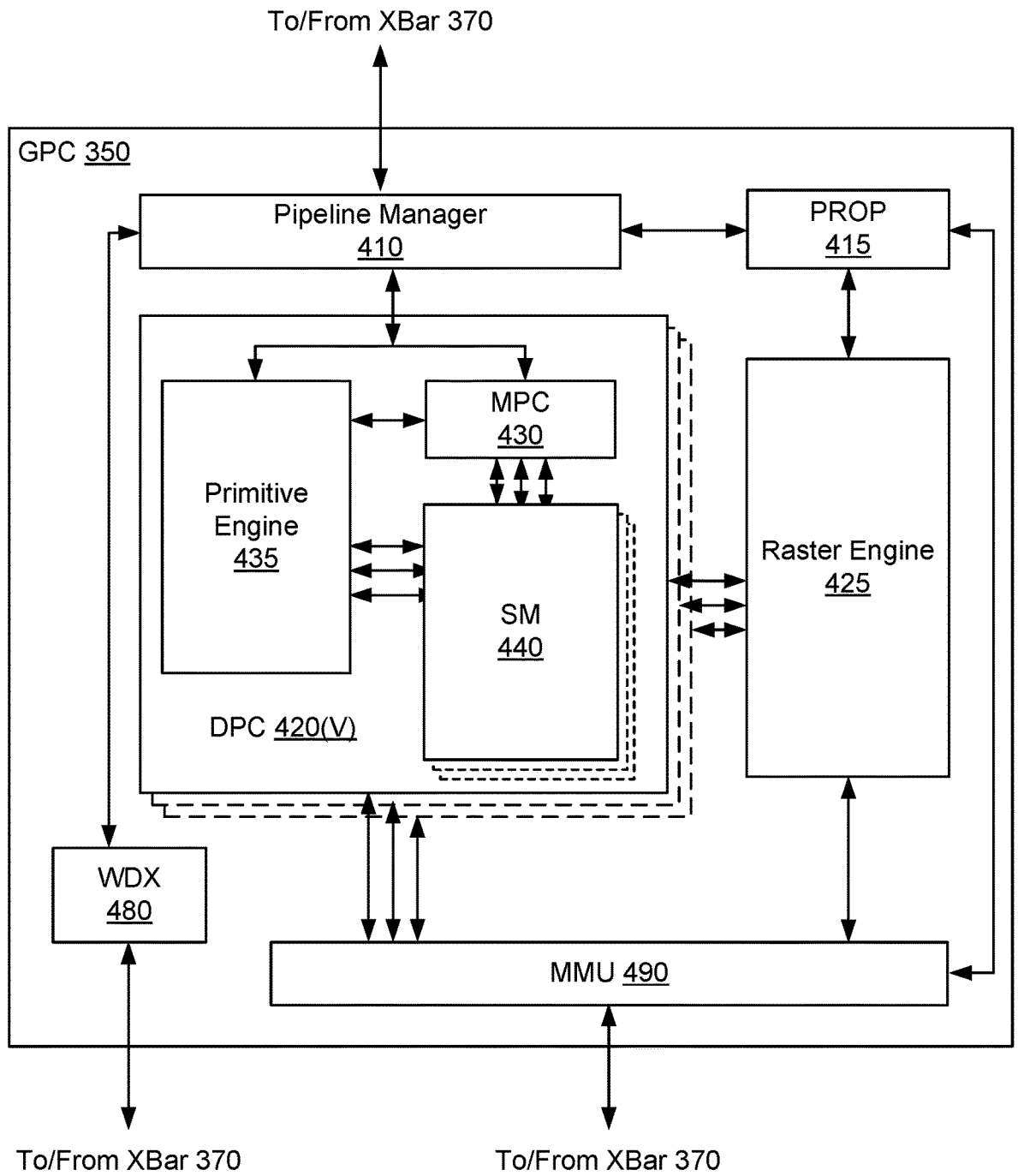
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
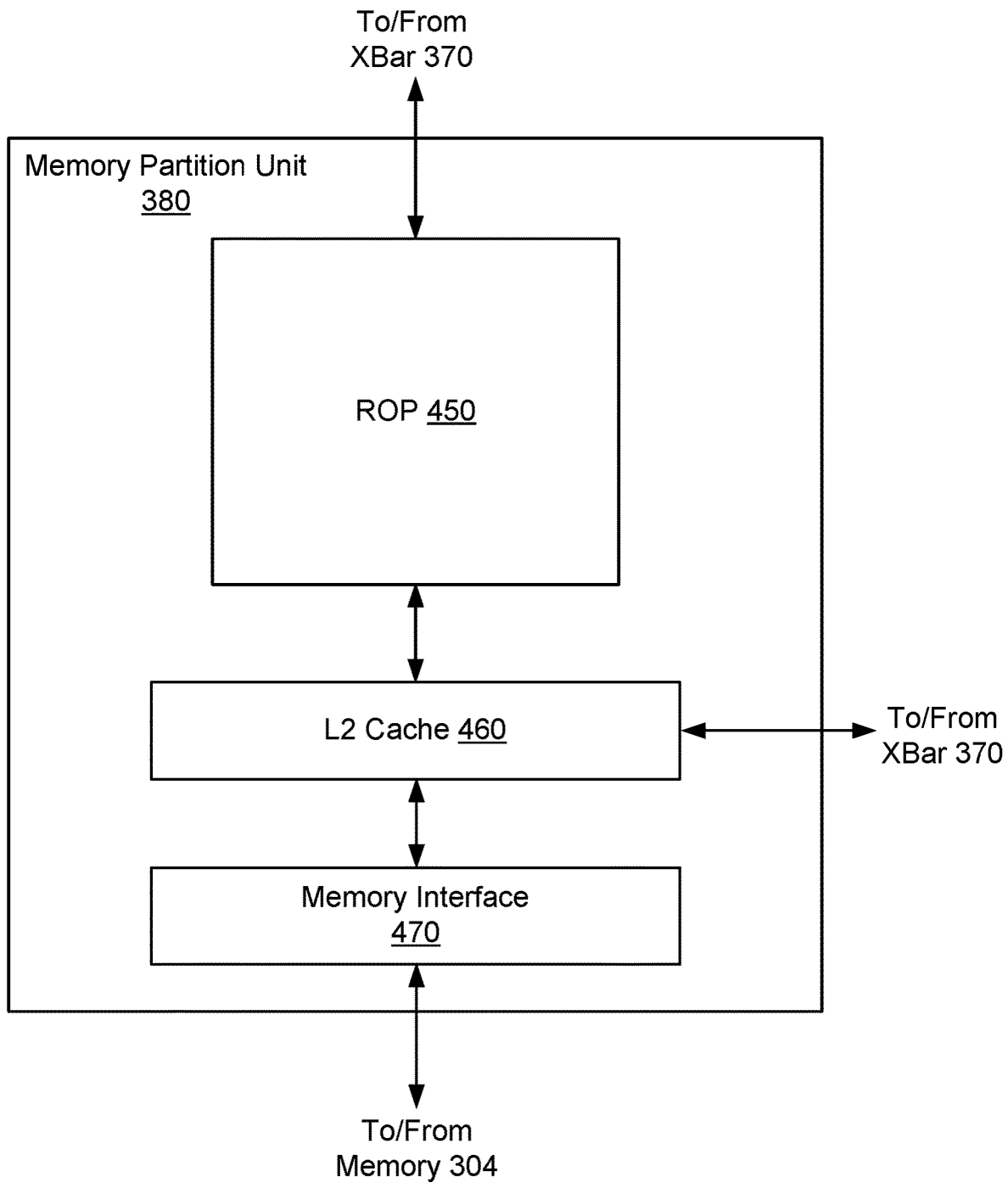
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiments, the ROP unit 450 may be outside of the memory partition unit 380. For example, the ROP unit 450 may reside in the GPC 350 or another unit.

Figure 5A:
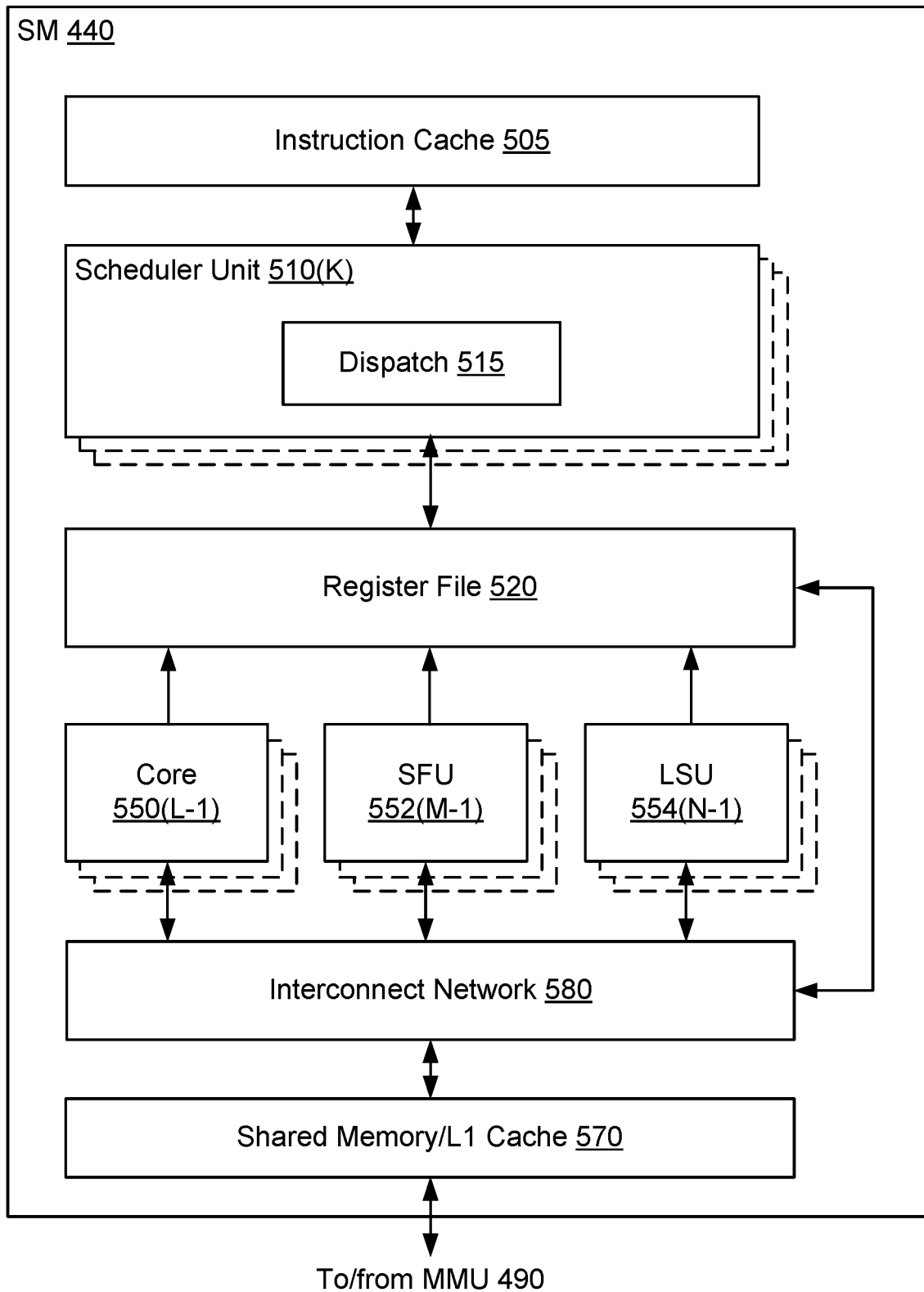
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
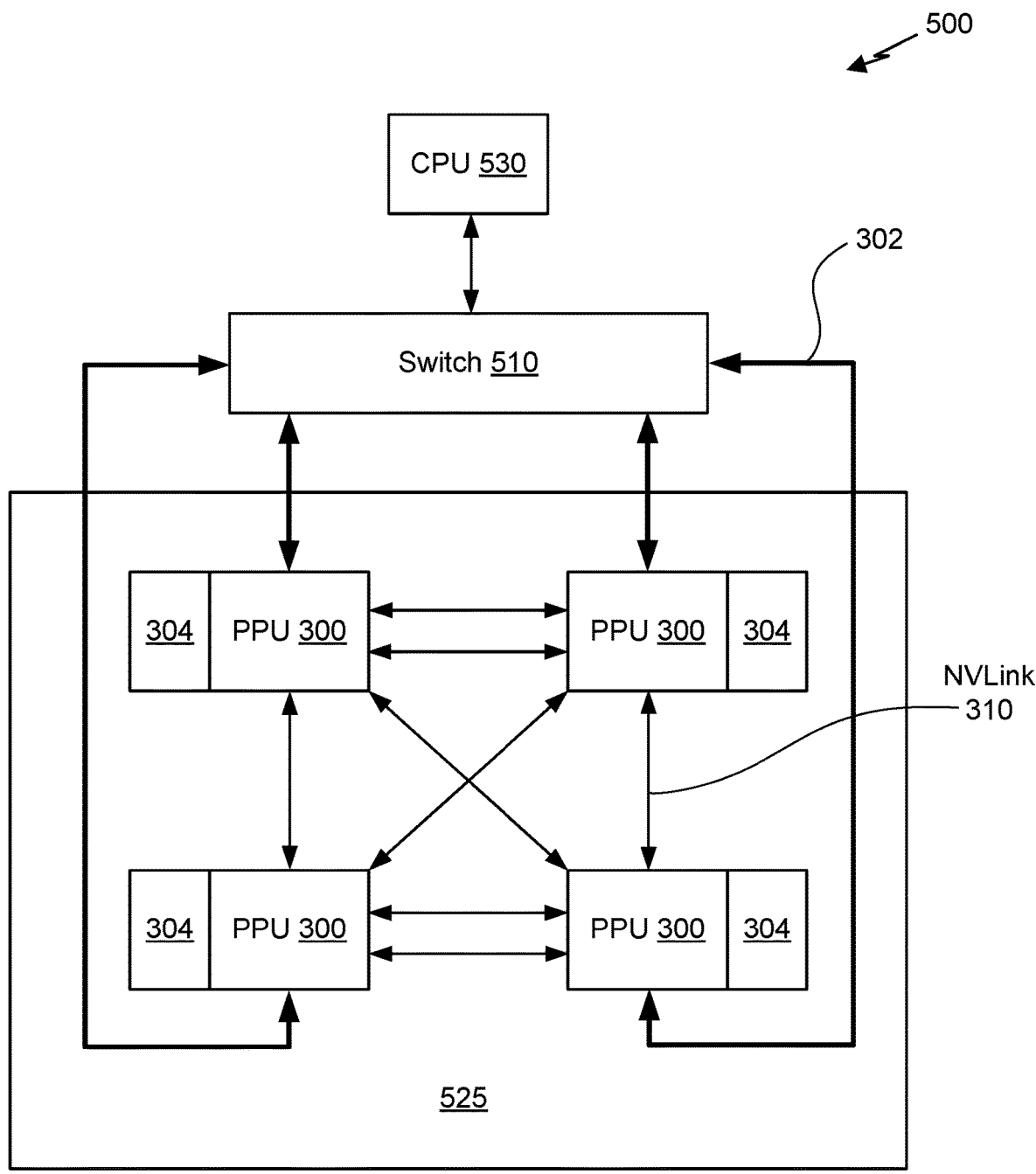
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
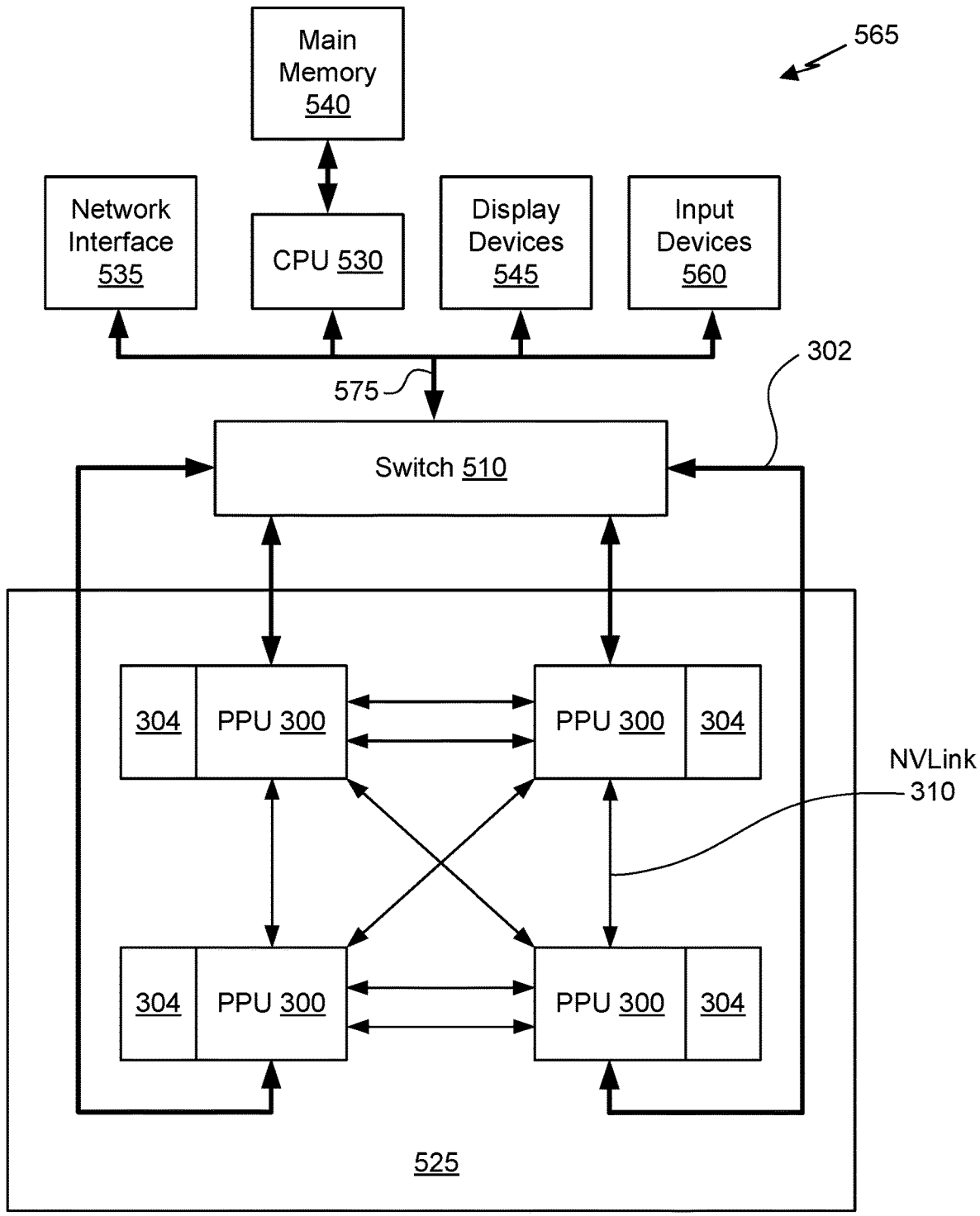
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
creating a plurality of duplicate memory pages for a plurality of compute units, wherein local memory of each compute unit of the plurality of compute units stores a respective duplicate memory page of the plurality of duplicate memory pages and wherein each compute unit of the plurality of compute units directs its issued memory instructions to the respective duplicate memory page stored in the local memory of the compute unit;
intercepting a memory instruction issued by a particular compute unit of the plurality of compute units to the respective duplicate memory page stored in the local memory of the particular compute unit, the memory instruction being at least one of a store instruction, atomic instruction, or a reduction instruction directed towards the respective duplicate memory page stored in the local memory of the particular compute unit;
identifying that the memory instruction is annotated to indicate that coherence across the plurality of compute units, including synchronization of the plurality of duplicate memory pages, is required in order to subsequently perform the memory instruction;
responsive to identifying that the memory instruction is annotated to indicate that coherence across the plurality of compute units is required, collapsing the plurality of duplicate memory pages to create a shared memory page in local memory of a select compute unit of the plurality of compute units;
causing the memory instruction to be performed on the shared memory page.

2. The method of claim 1, wherein the plurality of compute units include at least one graphics processing unit (GPU).

3. The method of claim 2, wherein the local memory of the at least one GPU is device memory of the at least one GPU.

4. The method of claim 1, wherein the plurality of compute units include at least one central processing unit (CPU).

5. The method of claim 4, wherein the local memory of the at least one CPU is system memory of a system that includes the at least one CPU.

6. The method of claim 1, further comprising:
setting a first write-duplicate bit in a page table entry for a page corresponding to the plurality of duplicate memory pages, the first write-duplicate bit indicating that the page has been duplicated to create the plurality of duplicate memory pages.

7. The method of claim 6, further comprising:
setting a second write-duplicate bit in a translation lookaside buffer (TLB) of each compute unit of the plurality of compute units, the second write-duplicate bit indicating that the page has been duplicated to create the plurality of duplicate memory pages.

8. The method of claim 7, wherein the collapsing is performed responsive to determining that the second write-duplicate bit in the TLB of the particular compute unit is set to indicate that the respective duplicate memory page stored in the local memory of the particular compute unit is a duplicate of the page.

9. The method of claim 8, further comprising:
responsive to identifying that the memory instruction is annotated to indicate that coherence across the plurality of compute units is required, triggering a page fault in the TLB of the particular compute unit to cause the collapsing of the plurality of duplicate memory pages.

10. The method of claim 7, wherein the collapsing is performed when the particular compute unit that issued the memory instruction is a GPU.

11. The method of claim 1, wherein the plurality of compute units are a proper subset of all compute units of a computing system.

12. The method of claim 1, further comprising:
after creating the shared memory page, causing the plurality of compute units to issue memory instructions to the shared memory page.

13. The method of claim 1, wherein collapsing the plurality of duplicate memory pages to create the shared memory page in the local memory of the select compute unit includes:
stalling the memory instruction and additional memory instructions subsequently issued by the particular compute unit to the respective duplicate memory page stored in the local memory of the particular compute unit;
causing the duplicate memory page stored in the local memory of the particular compute unit to be invalidated;
causing remaining compute units of the plurality of compute units to invalidate their respective duplicate memory pages and to flush all pending memory instructions issued to their respective duplicate memory pages;
selecting a particular duplicate memory page of the plurality of duplicate memory pages to use as the shared memory page, the particular duplicate memory page being stored in the local memory of the select compute unit;
updating the plurality of compute units to point to the shared memory page;
validating the shared memory page for use by the plurality of compute units; and
causing the plurality of compute units to resume execution including issuing further memory instructions to the shared memory page.

14. The method of claim 13, wherein responsive to identifying that the memory instruction is annotated to indicate that coherence across the plurality of compute units is required, a page fault is triggered by the particular compute unit and a fault message is transmitted to a unified memory driver.

15. The method of claim 14, wherein the unified memory driver, responsive to receiving the fault message, marks the duplicate memory page stored in the local memory of the particular compute unit as invalid.

16. The method of claim 15, wherein the unified memory driver further verifies that the fault message was received as a result of the memory instruction being annotated to indicate that coherence across the plurality of compute units is required.

17. The method of claim 16, wherein the unified memory driver, responsive to verifying that the fault message was received as a result of the memory instruction being annotated to indicate that coherence across the plurality of compute units is required, sends messages to the remaining compute units to invalidate their respective duplicate memory pages and to flush the pending memory instructions issued to their respective duplicate memory pages.

18. The method of claim 17, wherein the unified memory driver further:
selects the particular duplicate memory page of the plurality of duplicate memory pages to use as the shared memory page,
causes the plurality of compute units to be updated to point to the shared memory page, causes the shared memory page to be validated for use by the plurality of compute units, and
sends a resume signal to the plurality of compute units to cause the plurality of compute units to resume execution including issuing the further memory instructions to the shared memory page.

19. The method of claim 1, wherein the collapsing the plurality of duplicate memory pages to create the shared memory page and the causing the memory instruction to be performed on the shared memory page ensures coherence for the memory instruction.

20. The method of claim 1, wherein the particular compute unit and the select compute unit are the same compute unit.

21. The method of claim 1, wherein the memory instruction is annotated in advance by a programmer of an application causing the memory instruction to be issued.

22. The method of claim 1, wherein the memory instruction is annotated in accordance with a defined consistency model.

23. The method of claim 1, wherein the plurality of duplicate memory pages are collapsed in a manner that results in a single instance of the shared memory page that incorporates all prior memory instructions issued by the plurality of compute units.

24. The method of claim 1, wherein after creating the shared memory page, the plurality of compute units are configured to issue subsequent memory instructions to the shared memory page.

25. A system, comprising:
a memory storing logic and including a plurality of local memories;
a plurality of compute units each having a local memory of the plurality of local memories; and
a processor that executes the logic to perform a method comprising:
creating a plurality of duplicate memory pages for a plurality of compute units, wherein local memory of each compute unit of the plurality of compute units stores a respective duplicate memory page of the plurality of duplicate memory pages and wherein each compute unit of the plurality of compute units directs its issued memory instructions to the respective duplicate memory page stored in the local memory of the compute unit;
intercepting a memory instruction issued by a particular compute unit of the plurality of compute units to the respective duplicate memory page stored in the local memory of the particular compute unit, the memory instruction being at least one of a store instruction, atomic instruction, or a reduction instruction directed towards the respective duplicate memory page stored in the local memory of the particular compute unit;

identifying that the memory instruction is annotated to indicate that coherence across the plurality of compute units, including synchronization of the plurality of duplicate memory pages, is required in order to subsequently perform the memory instruction;

responsive to identifying that the memory instruction is annotated to indicate that coherence across the plurality of compute units is required, collapsing the plurality of duplicate memory pages to create a shared memory page in local memory of a select compute unit of the plurality of compute units;

causing the memory instruction to be performed on the shared memory page.

26. A non-transitory computer-readable media storing computer instructions that, when executed by a processor, cause the processor to perform a method comprising:

creating a plurality of duplicate memory pages for a plurality of compute units, wherein local memory of each compute unit of the plurality of compute units stores a respective duplicate memory page of the plurality of duplicate memory pages and wherein each compute unit of the plurality of compute units directs its issued memory instructions to the respective duplicate memory page stored in the local memory of the compute unit;

intercepting a memory instruction issued by a particular compute unit of the plurality of compute units to the respective duplicate memory page stored in the local memory of the particular compute unit, the memory instruction being at least one of a store instruction, atomic instruction, or a reduction instruction directed towards the respective duplicate memory page stored in the local memory of the particular compute unit;

identifying that the memory instruction is annotated to indicate that coherence across the plurality of compute units, including synchronization of the plurality of duplicate memory pages, is required in order to subsequently perform the memory instruction;

responsive to identifying that the memory instruction is annotated to indicate that coherence across the plurality of compute units is required, collapsing the plurality of duplicate memory pages to create a shared memory page in local memory of a select compute unit of the plurality of compute units;

causing the memory instruction to be performed on the shared memory page.

* * * * *